INVENTOR:
RICHARD WARD

INVENTOR:
RICHARD WARD
BY

Feb. 17, 1970  R. WARD  3,495,499
REMOTE CONTROL OF MINE ROOF SUPPORTS
Original Filed Feb. 15, 1966  9 Sheets-Sheet 8
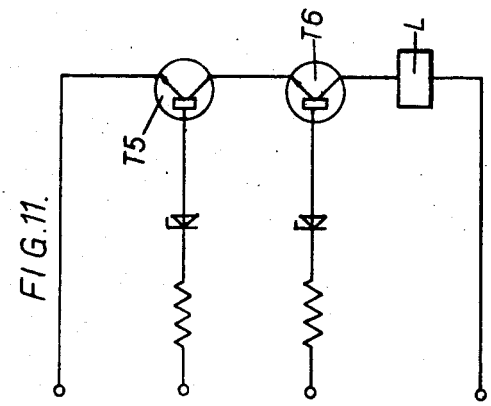
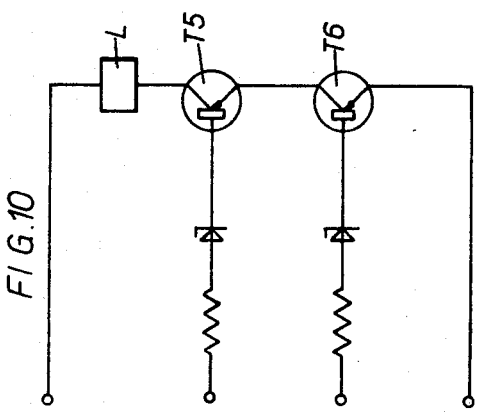
INVENTOR:
RICHARD WARD
BY

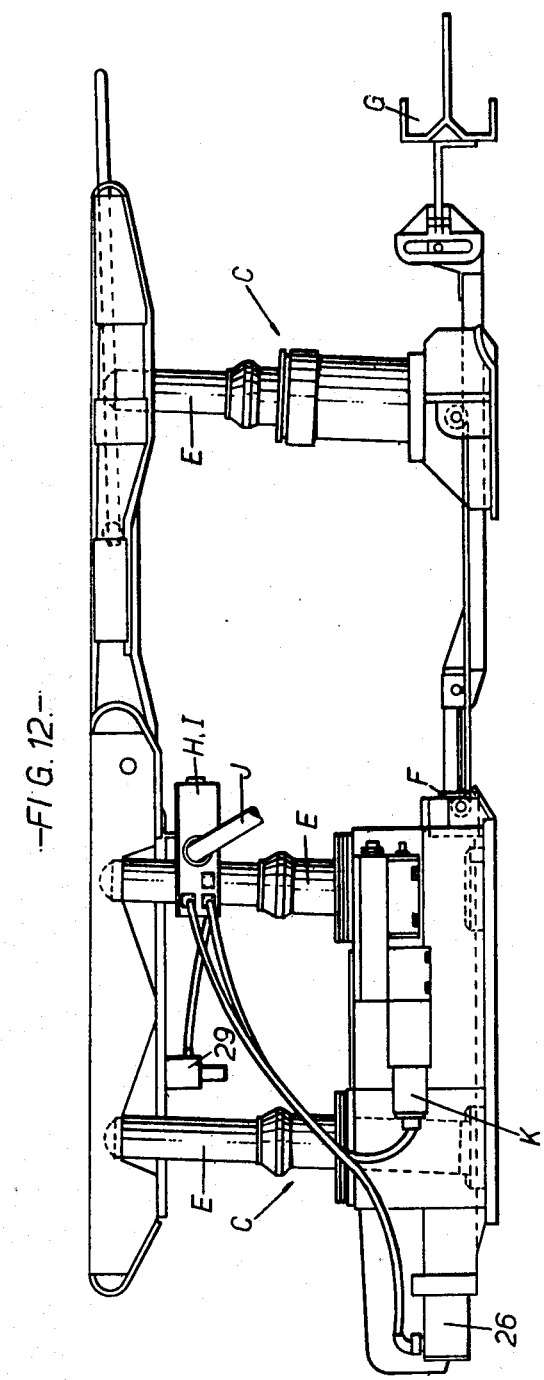

United States Patent Office 3,495,499
Patented Feb. 17, 1970

3,495,499
REMOTE CONTROL OF MINE ROOF SUPPORTS
Richard Ward, Worsley, England, assignor to Gullick Limited, Wigan, Lancashire, England, a British company
Continuation of application Ser. No. 527,467, Feb. 15, 1966. This application July 29, 1968, Ser. No. 751,681
Claims priority, application Great Britain, Mar. 18, 1965, 11,458/65
Int. Cl. F01b 25/26; F15b 13/044; F21d 11/00
U.S. Cl. 91—1                                     10 Claims

ABSTRACT OF THE DISCLOSURE

Side-by-side self-advancing mine roof supports are divided into groups, each containing a plurality of individual mine roof supports. Command signals are employed to prepare a particular group for actuation and to select a particular individual support within that group to be actuated.

---

Figure 1:
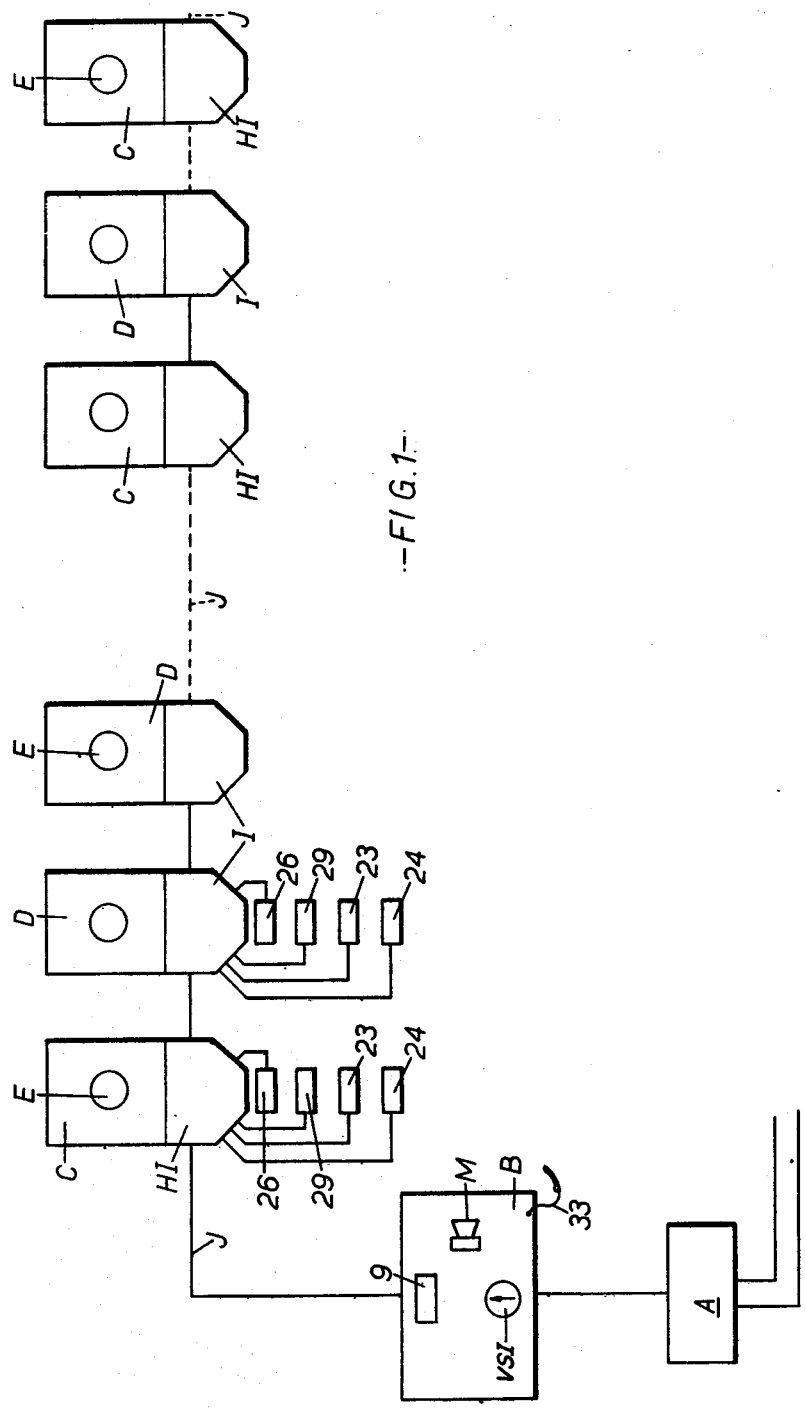

This application is a continuation of application No. 527,467, now abandoned.

This invention is for improvements in or relating to the remote and automatic remote control of powered or self-advancing mine roof supports in longwall systems of mining.

In one such system a plurality of self-advancing chocks or supports extend along the mineral (e.g. coal) face. Each chock or support comprises one or more legs or props, adapted to be extended by pressure-fluid, and a pressure-fluid ram device for advancing the chock towards the mineral face after its props or legs have been temporarily released from between floor and roof. The ram devices of the supports, or some of them, may also be arranged to push or "snake" a mineral conveyor towards the face. The ram devices, which are anchored to the conveyor, are then retracted so as to draw the supports up to the conveyor. Following this, the supports are again re-set so as to support the roof.

Remote and automatic remote control systems for roof supports in longwall mining are known but such systems as available at the present time involve a large number of electrical conductors or lines between the remote control station and the equipment at the coal face.

One object of the present invention is to provide a remote or automatic remote control system in which, having regard to the large number of supports or chocks at the coal face, a relatively small number of lines or conductors is required between the face and the remotely located control station.

A further object of the invention is to provide a remote or automatic remote control system for mine roof supports which is relatively simple and uses a relatively small number of electronic components and relays as compared with such systems at present available.

According to the present invention there is provided a system for the automatic remote control of self-advancing mine roof supports in which advancement and setting of the supports is effected by pressure-fluid-operated devices under the control of electrically actuated valves, actuation of said valves being controlled by electronic gating circuits wherein the roof supports are arranged in groups along the mineral face and wherein electronic gating circuits for the remote selection of the groups and electronic gating circuits for the selection of operation of individual supports in the groups receive their signals over the same lines. This makes it possible to reduce the number of lines between the equipment at the face and the remote operating station or console. In one preferred arrangement the gating circuits for group selection have a greater number of inputs than the gating circuits for individual support selection within a selected group. This eliminates any risk of signals for individual support operation accidentally opening a group selection gate.

To reduce still further the number of signal lines between the equipment at the coal face and the remote control station some of the electronic gates for group selections have all NPN type transistors and the others have all PNP type transistors. Similarly, for individual chock selection within a group some of the gating circuits have all NPN type transistors and others have all PNP type transistors.

For instance, if a mineral face requires twenty groups or sections of chocks, each group or section comprising twenty chocks, it is possible to control the selection of all the groups and all the chocks by means of five lines between the remote control station and the support arrangement at the face. So far as section or group selection is concerned this may be achieved by providing ten of the sections or groups with PNP gates having three inputs and ten with NPN gates having three inputs. This will give three out of five selections twice, i.e. twenty selections.

Similarly, if ten of the supports in each group have NP gates with two inputs and ten have NPN gates with two inputs, this will give two out of five doubled, i.e. twenty selections or different codes.

Preferably, when utilising a punched tape or the like for automatic remote control, the instruction appertaining to each tape hole code is printed as information alongside it in, say, letters and/or numerals. Conveniently, an enlarged image of this information is made available for observation by a person at the remote control station or console. For example, if the instruction given by the code on the punched tape is that chock No. 2 in section or group A is to be selected and the chock is to be advanced and the tape reader is to dwell on this selection, until certain conditions are satisfied, and snaking of the conveyer is to the left, the display on the screen may be A2–A–D–L.

The operator can, therefore, see at a glance what is happening without having to work out a code given by an array of lights. This has to be done where remote control is effected through an electronic counter as has been done heretofore.

The enlarged image of the information on the tape may be provided by an optical magnifying and projecting system similar in construction to a known form of cinematograph projector.

Figure 2:
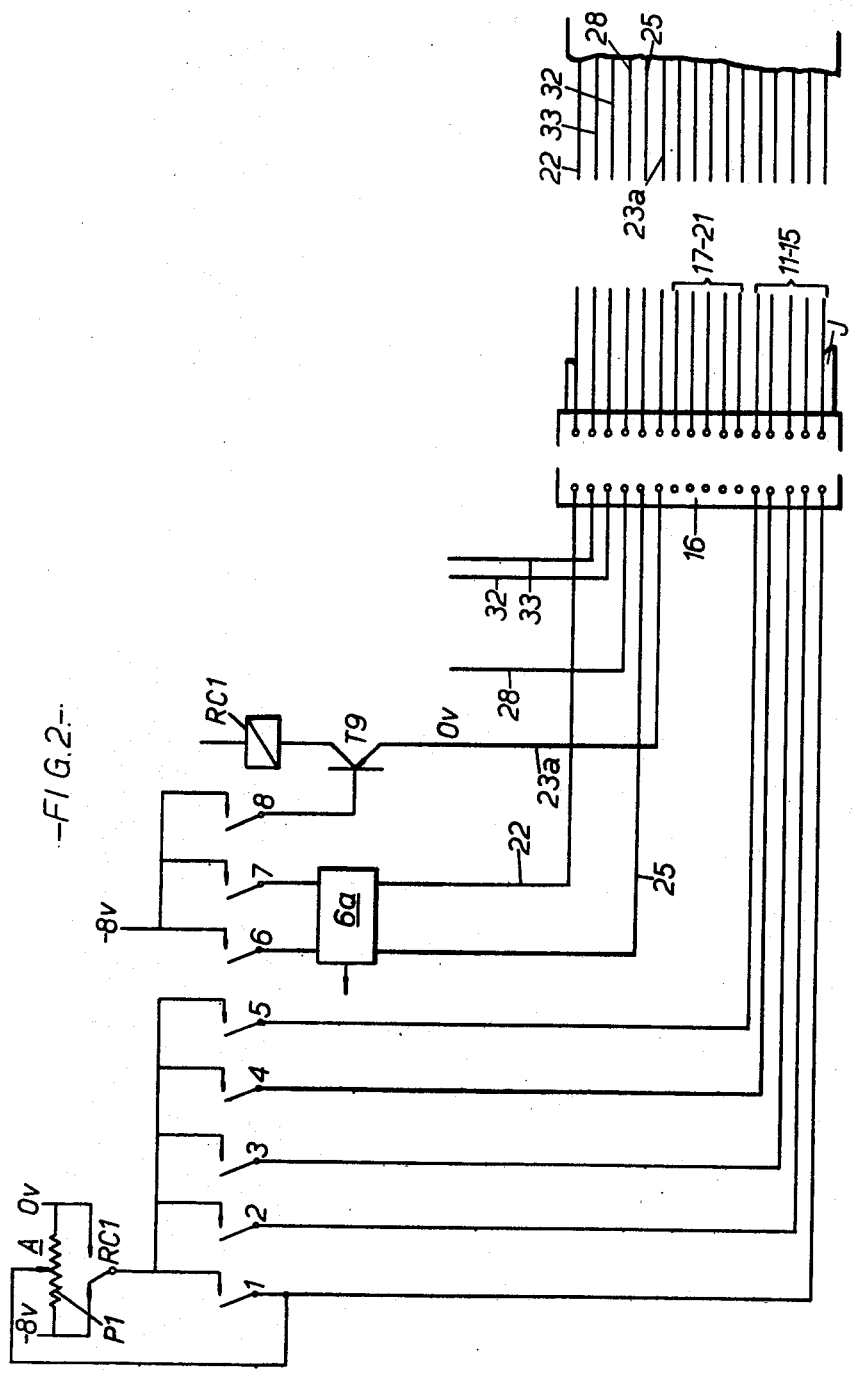
Figure 3:
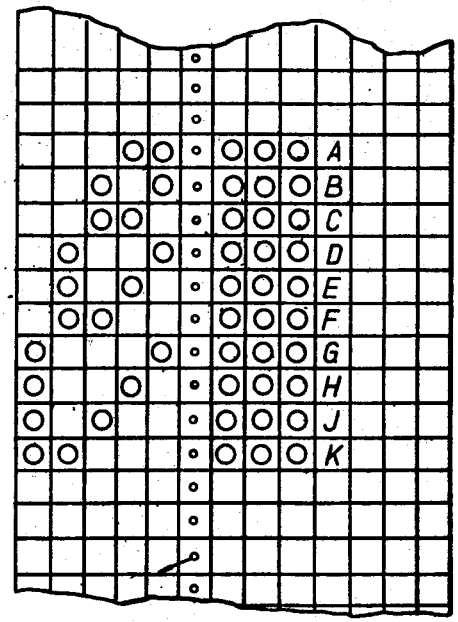
Figure 4:
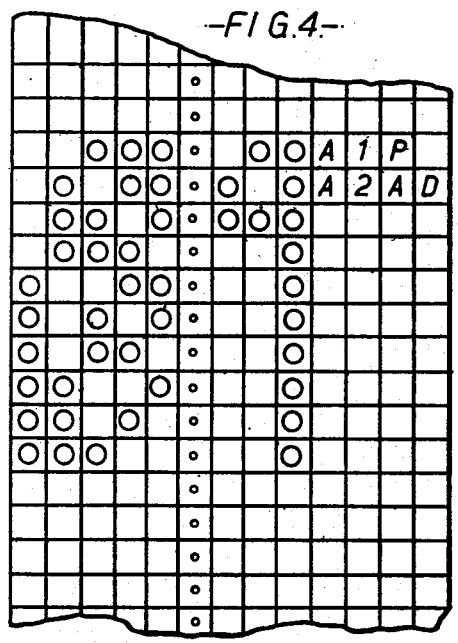
Figure 5:
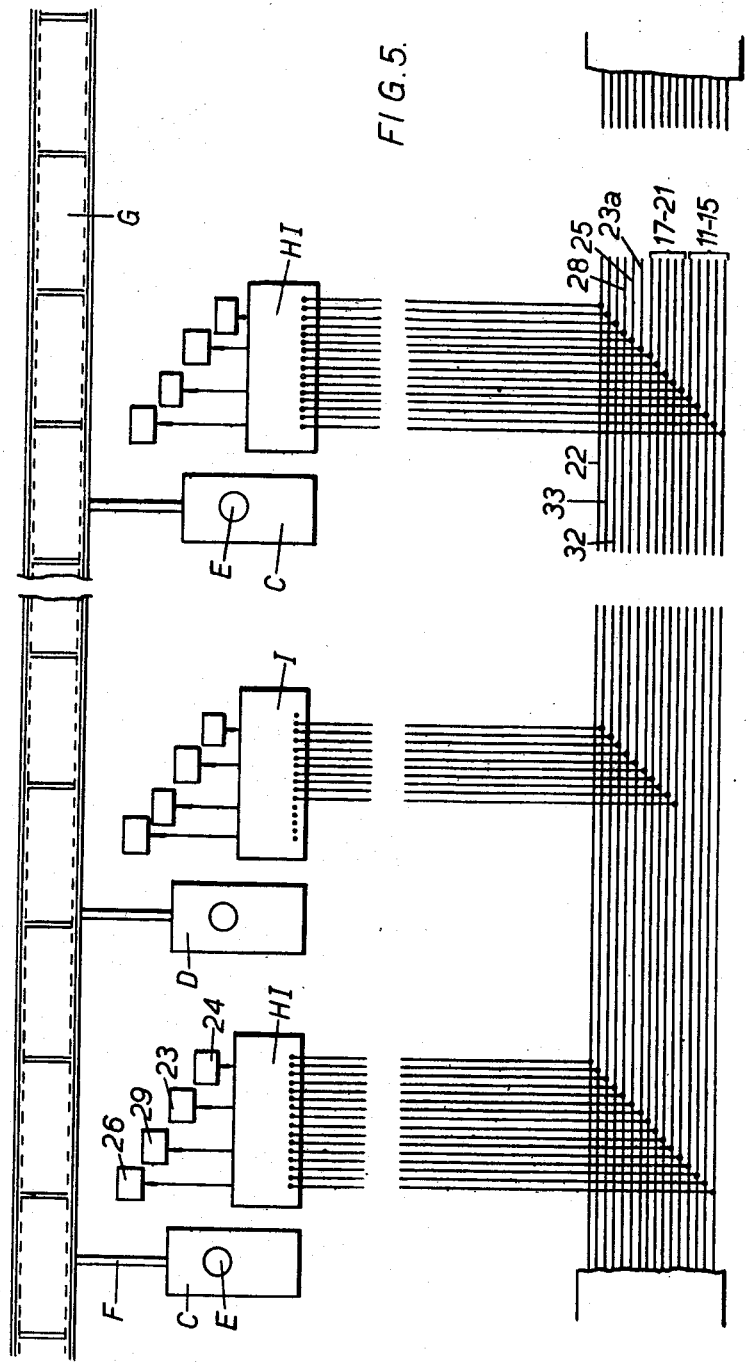
Figure 6:
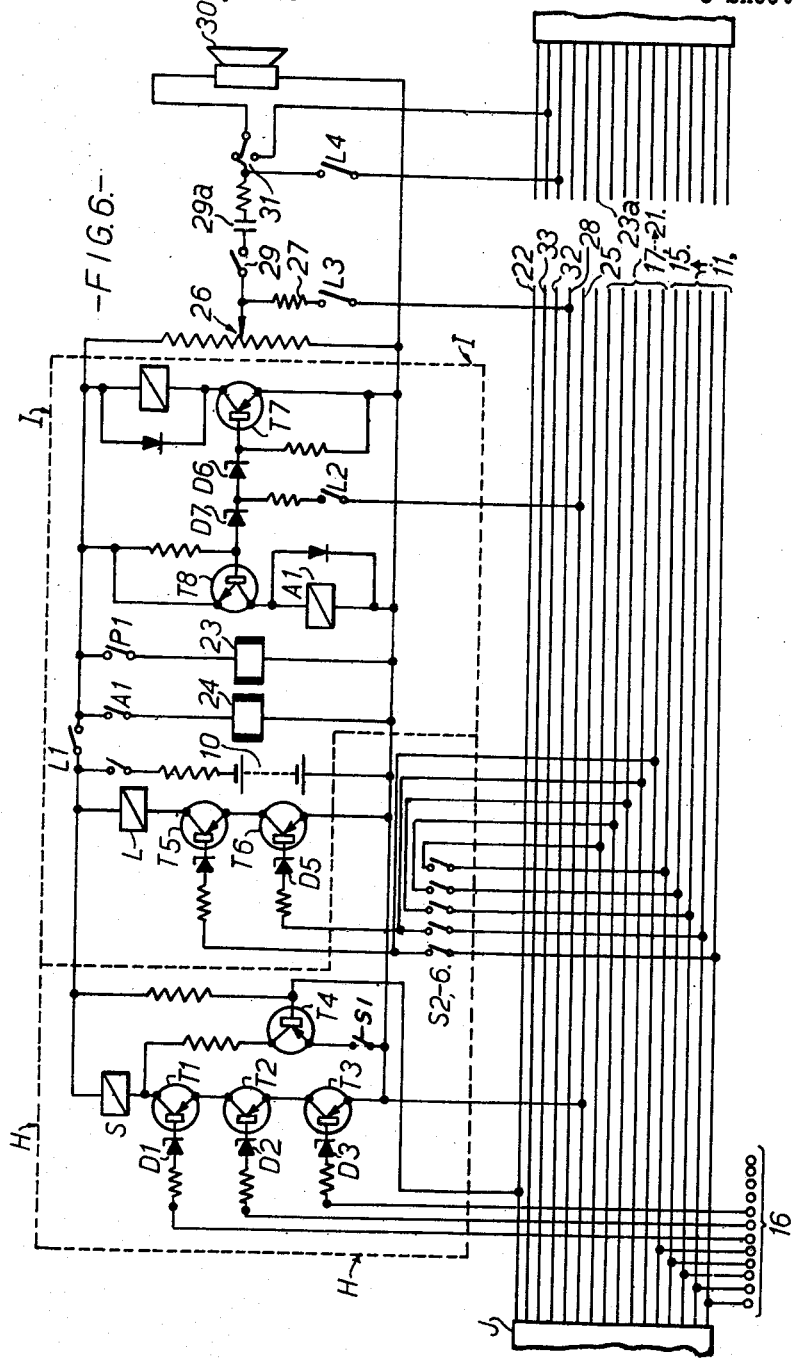
Figure 7:
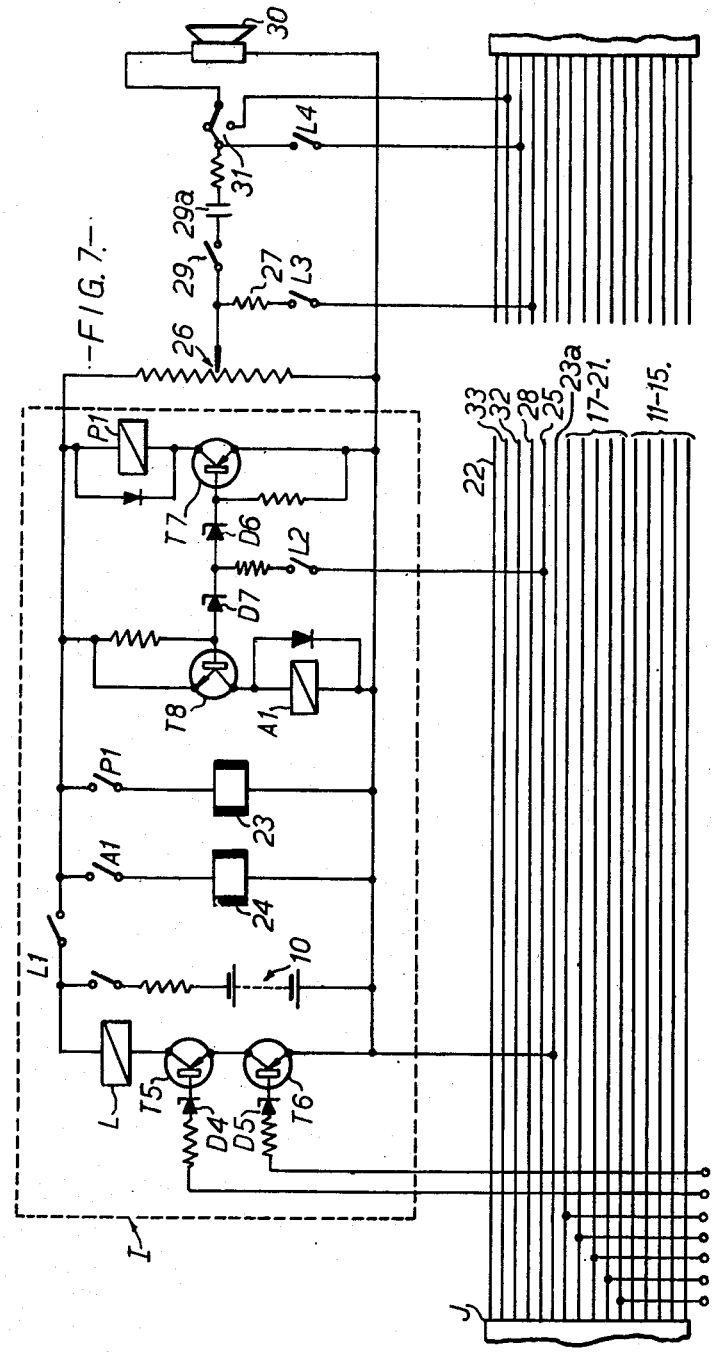
Figure 9:
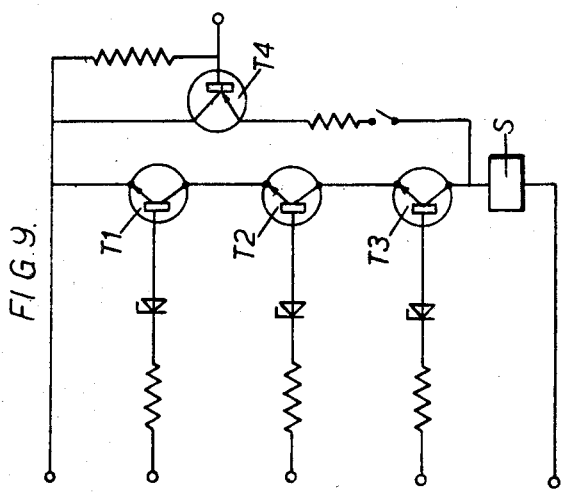
Figure 8:
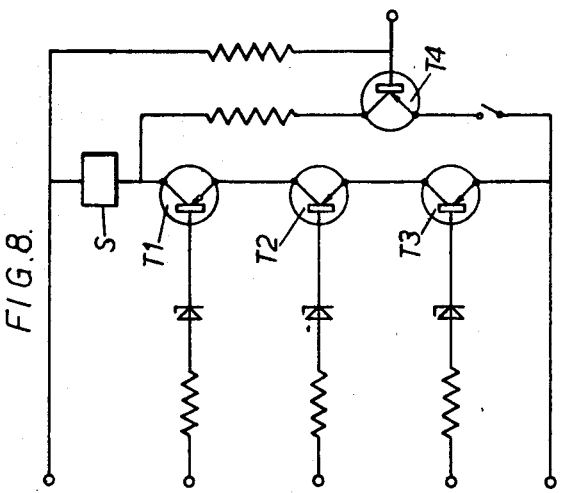

One particular embodiment of the invention as applied to the remote automatic control of a roof support system, for longwall mining, comprising, say, twenty groups or sections of twenty supports or chocks, will now be described, by way of example. In the following description reference is made to the accompanying diagrammatic drawings in which:

FIGURE 1 is a diagram showing the general layout of the system,

FIGURE 2 is a diagrammatic representation of the punched tape reader incorporated in the console at the remote station and also shows the electrical connections going to and coming from the equipment at the mineral face, FIGURE 3 shows a fragment of the punched tape for section or group selection codes, FIGURE 4 shows a fragment of punched tape for individual chock selection codes, FIGURE 5 is a diagram of the equipment at the mineral face, FIGURE 6 is a diagram showing one of the twenty section or group switching boxes, including the section or group address gate, and also chock No. 1 switching box and address gate in that section or group, FIGURE 7 shows an individual support or chock switching box including the support address gate, FIGURE 8 shows a section or group selection gate having PNP type transistors, FIGURE 9 shows a section or group selection gate having NPN type transistors, FIGURE 10 shows an individual chock or support selection gate having PNP type transistors, FIGURE 11 shows an individual clock or support selection gate having NPN type transistors, and FIGURE 12 is a side elevation of one of the powered or self-advancing supports suitable for use in the system.

Referring first to FIGURE 1, A indicates the power supply for the system, which it may be assumed is a 8-volt supply which derives its energy from the normal lighting supply available in the pit, and B indicates the control console at the remote station.

It may be assumed that at the mineral face there are twenty sections or groups of supports, each section or group consisting of twenty individual supports. In FIGURE 1 the reference letter C indicates the first chock or roof support of each group and the reference letters D the remaining nineteen chocks of that group. Only a few of the groups and a few of the chocks of each group are shown in FIGURE 1.

Each chock has at least one hydraulically extensible leg or prop E and (see FIGURE 5) a double-acting ram F for pushing over the conveyor G and then advancing the support or chock up to the conveyor.

Associated with each of the supports C (i.e. the first support in each group or section) is a section switching and an individual switching box, for that support, designated collectively H.I. Each of the remaining nineteen supports D in each section has its own individual switching box I. It is only for convenience that the switching box H is combined with the switching box I of the first support in each group. It could be quite separate apart from the necessary electrical interconnections.

Briefly (see FIGURE 1), the automatic master control device in the remote station or console B (e.g. at the end of the coal face) is a punched-tape reader having eight selection contacts or sensing brushes which have been numbered 1 to 8 in FIGURE 2. These sensing brushes read, step-by-step, an endless loop of tape, of the character shown, for example, in FIGURES 3 and 4 on which the sequence of chock operation required are pre-recorded.

Any form of moving or snaking sequence for the conveyor G (FIGURE 5) or any order of chock operation may be recorded on the tape so that the system is equally suitable for remote control of individual chocks or for bank or group control.

The display of information to the operator indicating which chock has been selected and what function it is to perform is in the form of letters and numerals printed on the tape alongside the tape-hole code as shown in FIGURES 3 and 4. A magnified image of these letters and numerals is provided by a magnifying glass 9 incorporated in the console B and positioned so as to be convenient for observation and easy reading by the operator.

A potentiometer P1 (see FIGURE 2) is connected in parallel across the 8-volt supply. The wiper of this potentiometer is connected to the selection line associated with the sensing brush 1. The wipers of similar potentiometer circuits (not shown) are connected respectively to the sensing brushes 2, 3, 4, 5, associated with the other four selection lines.

The sensing brush 8 is connected through transistor T9 to a relay RC1, and is for the purpose of changing the polarity of brushes 1, 2, 3, 4 and 5. This change of polarity is necessary according to whether a PNP transistor or NPN transistor gate has been selected, as hereinafter described.

Sensing brushes 6 and 7 are both connected to a logic circuit 6a. The outputs from the logic circuit 6a are as follows:

(1) A push signal (i.e. a signal to cause a ram F to push over the conveyor G) is put on line 25 when there is a hole at level 6 (i.e. in register with brush 6) and a blank at level 7 (i.e. in register with brush 7) in the punched or perforated tape.

(2) An advanced signal (i.e. a signal to cause a ram F to advance its roof support) is put on line 25 when there is a blank at level 6 and a hole at lever 7 in the tape.

(3) A signal is put on line 22 to unlatch all section switching boxes H when there is a blank at level 6 and also a blank at level 7 in the tape.

(4) An internal dwell signal is generated when there is a hole at level 6 and also a hole at level 7 in the tape. The function of this dwell signal is to prevent the tape reader selecting the next chock or support in a sequence until a correct combination of signals is received from a pressure switch 29 and a ram potentiometer 26 shown in FIGURE 6 and hereinafter to be described.

Normally the potentiometer P1 holds the selection lines at −4 volts in the absence of a signal. A potentiometer in the logic circuit 6a holds the solenoid line 25 at −4 volts in the absence of an advance or push signal.

To avoid the necessity of a power cable along the face for providing power for the operation of the remote automatic control and operating system each chock (see FIGURES 6 and 7) is provided with its own primary battery 10. Conveniently this is a mercury battery having a long life and which is intrinsically safe for use in mining conditions.

Alternatively a battery may be housed in each section switching box H and arranged when switched on to provide electric current for all the chocks in the section with which the section switching box is associated.

The tape reader is adapted from a standard unit capable of reading or sensing an eight level tape, i.e. a tape having up to eight holes in each reading position. Six holes are used, in conjunction with the sensing brushes 1 to 5 and 8, for group and chock selection and the other two, in conjunction with the sensing brushes 6 and 7, for defining the operation of the selected chock.

The tape reader contacts or sensing brushes 1 to 5, allotted to group and chock selection, are connected (see FIGURES 2 and 6) to the five lines numbered 11, 12, 13, 14, 15 of the cable J which extends along the coal face.

An appropriately selected combination of three of the conductors 11, 12, 13, 14 and 15 is connected by a coding plug 16 to a three input "and" gate and latching circuit comprising (see FIGURE 6) transistors T1, T2 and T3 and latching transistor T4 respectively, incorporated in each group switching box H.

It will be appreciated that there will be a coding plug 16, for each section or group of chocks. A different combination of three of the conductors 11, 12, 13, 14 and 15 will be connected to the gate T1, T2, T3 of each section or group switching box H.

The coding system provides for a maximum of twenty sections or groups of chocks with twenty chocks in each group, i.e. a total of 400 chocks. Ten of the conductors in the cable J are used for group and chock selection, namely, the five conductors 11, 12, 13, 14 and 15 and five further conductors 17, 18, 19, 20 and 21. The latter do not extend back to the remote station but only between the switching boxes. It is, however, convenient to incorporate them in the cable J.

If a coal face has twenty sections or groups of chocks as is the case with the arrangement now being described, ten of the section or group switching boxes H will have gates with PNP type transistors T1, T2 and T3 and ten will have gates with NPN type transistors T1, T2 and T3. This arrangement gives three out of five selections twice, i.e. twenty selections or different gates.

The base of each transistor T1, T2 and T3 (see FIGURE 6) has a Zener diode D1, D2, D3 in series with it so that the signal voltage on the three lines selected from 11, 12, 13, 14 and 15 must go above a definite negative voltage to turn on the PNP gates and below another definite negative voltage to turn on the NPN gates. Thus, there is a neutral voltage zone at which the lines can be held when no selection is required.

In the particular embodiment of the invention now being described it may be assumed that the PNP gate turn-on voltage is −8 volts, the NPN gate turn-on voltage is common (zero potential) and the neutral voltage is −4 volts. As stated above, the selection contact or sensing brush 8 on the tape reader energises the relay RC1 at the remote station or console and determines whether the other five selection contacts or sensing brushes will put negative or common signals on the lines 11, 12, 13, 14 and 15 which, as indicated, always stand at −4 volts in the absence of a signal.

The gating circuit comprising transistors T1, T2, T3 when opened energises the relay coil S of the section or group relay having contacts S1, S2, S3, S4, S5, S6.

Only a short pulse on three of the five lines 11, 12, 13, 14 and 15 is necessary to select a particular section or group switching box H and close its relay as the pair of contacts S1, in the relay, hold it on through the latching transistor T4 the base of which is connected so that it is normally conducting. The base of the latching transistor T4 is also connected permanently to an "unlatch" line 22 in the cable J so that a pulse of the correct polarity on this line will unlatch the relay of any section switching box, which happens to be closed, by momentarily cutting off its latching transistor T4.

Instead of the latching transistor T4 an electro-magnetic remanence relay may be used, i.e. a relay which remains latched in by remanent magnetism until a reverse M.M.F. is applied to cancel it by, for example, passing current through a second coil in the reverse sense to the original magnetising current.

To sum up, each of the twenty section or group switching boxes H has an "and" gate, consisting of three transistors, and a relay having contacts S1–S6 connected in series, the inputs to the gate being connected to the transistor bases through Zener diodes. If the transistors are of the PNP type the gate will open and the relay will be closed if all the bases are made negative with respect to the common (zero potential) line 23a. If the transistors are of the NPN type the gate will open and the relay will be closed if all the bases are connected to the common line potential.

Closing of the contacts S2–S6 of the relay in the switching box of a particular section or group of chocks connects the five chock selection lines 17, 18, 19, 20 and 21, as indicated in FIGURE 6, to the individual switching box I of each of the chocks in that particular section.

Each individual chock switching box I has a two input "and" gate comprising transistors T5 and T6 and controls the relay coil L of a relay having contacts L1, L2, L3 and L4 but no latching circuit.

Ten of the individual chock switching boxes I have gates with NPN transistors T5 and T6 and ten have gates with PNP transistors T5 and T6. This arrangement provides the required twenty alternative selections.

Zener diodes D4 and D5 are used in the base circuits of the transistors T5 and T6 to give definite voltage levels. These diodes also serve to prevent unwanted currents flowing between switching boxes through the common selection lines.

It should be noted particularly that no individual chock switching box code can operate the gate of a section or group switching box, even although the individual chock switching boxes and section switching boxes share the same five lines. This is because three inputs are required to select a section switching box and the chock switching boxes utilise only two inputs, i.e. a "two" character code.

When a switching box I of a particular chock has been selected the relay having contacts L1–L4 switches on the battery 10 to power the remaining chock control circuits within that box and also connects the appropriate lines to a solenoid-valve switching circuit, a ram potentiometer transducer circuit, a pressure switch circuit, and a loudspeaker circuit.

The battery 10 is a mercury battery with a built-in resistor to render it intrinsically safe and has a terminal voltage of, say 8 volts and a capacity of 28 ampere hours. Having regard to the relatively small current required by the system such a battery will have a very long life, e.g. a life of the order of 5 years.

The solenoid-valve switching circuit includes two solenoids 23 and 24, one for operating the ram control valve K (see FIGURE 14) so that the ram will push over the conveyor and the other for operating the valve K to lower, advance and re-set the support. These solenoids are, of course, energised selectively from the battery according to the signals from the tape. This is achieved using only one line, 25, from the remote station.

For that purpose the solenoid circuit also comprises (see FIGURE 7) two transistors, T7 and T8, one in series with the energising coil of a relay P1 and the other in series with the energising coil of a relay A1. The bases of the two transistors are connected together by Zener diodes D6 and D7. One transistor is an NPN type and the other a PNP type.

When the switching box of a particular chock is selected the junction of the Zener diodes D6 and D7 is connected to the solenoid line 25, in the Cable J, through a pair of contacts L2 of the relay L. When neither of the solenoids 23, 24 is to be energised the solenoid line is held at −4 volts. If the solenoid line 25 is switched, by the tape reader at the remote station, to −8 volts the PNP transistor T7 conducts and its associated relay P1 closes. This energises the solenoid 23 which in turn operates the control valve K to cause the ram to push over the conveyor.

If the solenoid line 25 is switched by the tape reader to the common line 23a via console circuitry the NPN transistor T8 conducts and closes its associated relay A1 which in turn energises the solenoid 24. Thus, the control valve K is operated so as to lower the support, cause the hydraulic ram to advance the support, and then re-set the support.

Where the ram is single acting and is only required to advance the support, the circuit will only include the one transistor T8 and its associated components.

The purpose of the ram potentiometer circuit is to transmit to the remote station or console an indication of the position (i.e. extent of advance or retraction) of the ram which serves to push over the conveyor and then advance the support. The ram potentiometer circuit comprises a potentiometer proper or transducer 26 which is connected in circuit with the battery 10 via the relay contacts L1. The wiper of the potentiometer is connected by the relay contacts L3 and through the safety resistor 27, to the ram potentiometer/pressure switch line 28 in the cable J. The wiper of the potentiometer is moved in accordance with the movement of the ram so that the direct current voltage on the line 28 can be used to operate a suitable voltage sensitive instrument VSI at the console or remote station to indicate the position of the ram. Operation of the potentiometer by the ram may be effected by many of the known arrangements for adjusting a potentiometer in accordance with the extension and retraction of a ram or the like.

As the mercury batteries 10 have an extremely constant E.M.F. during their working life, ram position reading or indication should be accurate except when a solenoid valve is energized. To compensate for this, as a solenoid energising signal is transmitted from the console or remote station a compensating voltage may be applied to the ram-potentiometer-reading circuits to off-set the voltage drop due to the current taken by the solenoid valve.

Battery failure is indicated at the console or remote station when, with a ram fully advanced or fully retracted, whichever of these positions is chosen as corresponding to maximum voltage on the ram potentiometer line 28, the voltage indicated at the console falls below the normal maximum reading.

Each chock has a hydraulic pressure sensitive switch 29 which comes into operation at the completion of a chock setting sequence and signals back (e.g. by an audible signalling device M) such completion to the console. The tape may then advance. In other words, the advanced chock transmits a signal to the console, at the end of the face, which in turn may signal the next chock to advance. The next chock may not necessarily be an adjacent chock but is the one selected by the predetermined programme on the tape. Alternatively, the console signals the next operation which may be ram advance or some other operation, at the face, dependent on the planned sequence or programme.

Many different operating sequences for the chocks and associated equipment are visualized even to the extent of advancing the chocks from each end of the face. The only information required at the console or remote station from the pressure switch is whether it is open or closed. In order to save lines the pressure switch signal shares the ram potentiometer line 28. As the ram potentiometer circuit utilises a direct current signal, an alternating current signal from the pressure switch can share the same line without confusion. In practice there is always an audible warning signal fed to the selected switching box by bursts of alternating current. For the purpose of the present invention this alternating current is fed, via the pressure switch contacts and an isolating capacitor 29a, to the ram potentiometer wiper thereby superimposing a warning signal on the D.C. signal from the ram potentiometer when the pressure switch is closed.

Instead of using the usual telephone hand-set to provide for communication between the face and the console or remote station it is proposed in accordance with the present invention to provide an alternative and improved communications arrangement. For this purpose the loudspeaker 30, which gives the above-mentioned audible warning signal, is also designed to be used as a microphone. When the man on the face wishes to communicate with the console or remote station he utilises a telephone switch 31 to switch the loudspeaker from the warning line 32 to the telephone line 33. To reply the person at the console switches the communication circuit so that the loudspeaker is connected to the output of the common amplifier and operates as a loudspeaker instead of as a microphone. The person at the console is then able to speak to the man at the face. This two-way communication is established under the control of the console.

An advantage of the arrangement just described is that a man at the face is able to speak to the console or remote station with both hands free and at a considerable distance from the chock which is being operated.

Preferably the switch 31 for connecting the loudspeaker to the telephone line can only be operated by a key to ensure that a loudspeaker cannot be switched on and left on, it being necessary for the man at the face to withdraw his key at the end of a conversation.

As the "and" gates both in the section or group switching boxes and the individual chock switching boxes are connected across the battery permanently they must have a very low leakage when in the "off" condition to avoid exhausting the battery. It is preferable, therefore, to select a type of "and" gate using silicon transistors. With such transistors a leakage current of the order of one microampere can be achieved.

The control tape may be transparent to facilitate optical projection of the information on it as previously described.

Although the invention has been described with reference to the drawings as applied more particularly, to an automatic (e.g. punched tape) remote control system, it can also be applied to a manually-operated remote control system in which, for example, the punched tape reader is replaced by a series of pushbuttons or the like.

I claim:

1. In an automatic control system, a mine roof support system including a plurality $m$ of groups of mine roof supports, each comprising a plurality $n$ of individual mine roof supports, the individual mine roof supports being positioned in side-by-side relation along the length of a mine face, and each mine roof support including an extensible prop, extension means for extending the prop into roof-supporting position, retraction means for retracting the prop out of roof-supporting position, and advancing means for advancing the support toward the mine face, in combination:

a plurality $p$ of conductors extending along the line of individual mine roof supports and over which all signals controlling said extension, retraction and advancing means are to be transmitted, the number $p$ being very much less than the total number of mine roof supports, command signal means connected to said conductors for (a) selectively energizing a predetermined number $q$ of said conductors in different combinations of said plurality $p$ thereof to produce a plurality $m$ of different group selection output signals and (b) selectively energizing a predetermined number $r$ less than the predetermined number $q$ of said conductors in different combinations of said plurality $p$ thereof to provide a plurality $n$ of different individual mine roof support selection output signals, a plurality $m$ of first switching means each connected to a number $q$ of said conductors $p$ in a particular combination for actuation by one of said plurality $m$ of group selection output signals, and a plurality $n$ of second switching means at each mine roof support and each connected to a number $r$ of said conductors $p$ in a particular combination in response to actuation of an associated first switching means for actuation by one of said plurality $n$ of individual mine roof support selection output signals to selectively control said extension, retraction and advancing means, whereby the same plurality $p$ of conductors are energized in sets of combinations to produce both the plurality of $m$ of different group output signals and the plurality $n$ of different individual selection signals.

2. In the automatic control system according to claim 1 wherein half said group selection output signals are of a first voltage level and the remainder of said group selection output signals are of a second voltage level different from said first voltage level, and half of said first switching means are responsive to group selection output signals of said first voltage level while the remainder of said first switching means are responsive to group selection output signals of said second voltage level.

3. The automatic control system according to claim 2 wherein half said individual mine roof support selection output signals are of said first voltage level and the remainder of said individual mine roof support selection output signals are of said second voltage level, and half of said second switching means are responsive to individual mine roof support selection output signals of said first voltage level while the remainder of said second switching means are responsive to individual mine roof support selection output signals of said second voltage level.

4. The automatic control system according to claim 1 wherein said first and said second switching means are AND gates, $m$ being equal to $n$ and $r$ being equal to $q$ minus one.

5. The automatic control system according to claim 4 wherein said command signal means includes mechanism for producing said group selection and said individual mine roof support selection output signals in time spaced relation.

6. In an automatic remote control system for self-advancing mine roof supports a plurality of which are positioned in side-by-side relationship along the length of a mine face and are selectable for operation by groups and individually in a selected group, each support being lowered, advanced and re-set by a pressure-fluid-operated means controlled by electrically-operated valve means in response to command signals from a command signal transmitting means in an electronic control network, in combination:

an electronic control network comprising command signal transmitting means, group selection electronic gates, one for each group of supports, each responsive to one only of a plurality of command signals which said command signal transmitting means may transmit over conductors connecting it to said electronic gates, a switch means associated with each of said electronic gates, and operative when its electronic gate responds to its command signal to put the group of supports associated with that group selection gate in a condition for operation to the exclusion of all other groups, individual support selection gates, for the supports in each group, each responsive to one only of a plurality of command signals which said command signal transmitting means may also transmit over the same conductors, and a switch means associated with each of said individual support selection gates and operative when its electronic gate is in a selected group and responds to its command signal to cause operation of the electrically-operated valve means of its support whereby said support is lowered, advanced and re-set.

7. A system as defined in claim 1 wherein at least one support in a group has a pressure sensitive switch which signals back to a remote control station the completion of a support advancing and setting sequence.

8. A system as defined in claim 7 wherein the pressure sensitive switch shares a conductor with means for indicating at the remote station the condition (i.e. extent of advance or retraction) of a pressure-fluid ram which serves to advance the support or to advance the support and push the conveyor toward the mineral face.

9. A system as defined in claim 8 wherein the signal from the pressure sensitive switch is an alternating current signal superimposed on a direct current signal from the ram condition indicating means.

10. In an automatic remote control for use with a system of self-advancing mine roof supports, a plurality of which are positioned in side-by-side relationship along the length of a mine face and are selectable for operation by groups and individually in a selected group, each support being lowered, advanced and re-set by pressure-fluid-operated means controlled by electrically-operated valve means in response to command signals from a command signal transmitting means in an electronic control network, in combination:

an electronic control network comprising command signal transmitting means, a plurality of group selection electronic gates, each adapted to operate with a group of supports and each being responsive to one only of a plurality of command signals which said command signal transmitting means may transmit over conductors connecting it to said electronic gates, a switch means associated with each of said electronic gates and adapted when its electronic gate responds to its command signal to put the group of supports associated with that group selection gate in a condition for operation to the exclusion of all other groups; a plurality of individual selection gates, each adapted to operate with one of the supports in each group and each being responsive to one only of a plurality of command signals which said command signal transmitting means may also transmit over the same conductors, and a switch means associated with each of said individual selection gates and adapted when its electronic gate is in a selected group and responds to its command signal to cause operation of the electrically-operated valve means of its support whereby such support is lowered, advanced and re-set.

References Cited

UNITED STATES PATENTS

| 3,198,083 | 8/1965 | Farr et al. | 91—1 |
| 3,207,041 | 9/1965 | Phillips | 91—1 |
| 3,285,015 | 11/1966 | Carnegie et al. | 91—1 |

PAUL E. MASLOUSKY, Primary Examiner

U.S. Cl. X.R.

61—45.2; 91—189, 459